Aug. 20, 1968   W. J. HAWLEY ET AL   3,397,826
METHOD OF DRAWING FORMED MATERIAL FROM A PLURALITY OF SOURCES
Filed Oct. 23, 1965

INVENTORS
Wilbur J. Hawley
Lee Merrick

Wayne Lang
AGENT

3,397,826
METHOD OF DRAWING FORMED MATERIAL FROM A PLURALITY OF SOURCES
Wilbur J. Hawley and Lee Merrick, Wellsville, N.Y., assignors to The Air Preheater Company, Inc., New York, N.Y., a corporation of Delaware
Filed Oct. 23, 1965, Ser. No. 503,048
1 Claim. (Cl. 226—1)

ABSTRACT OF THE DISCLOSURE

The method of simultaneously drawing sheet material from a plurality of independent sources in superposed layers by supplying the layers to feed rollers having a magnetic field sufficient to hold the layers substantially fixed relative to one another and thereafter rotating the rollers to draw and advance the superposed layers to a point of use.

---

This invention relates to a method for simultaneously drawing formed sheet material from a plurality of independent sources and advancing it integrally in superposed layers to a cutting means whereby a plurality of variously formed material sheets may be simultaneously cut to a similar dimension.

More particularly this invention relates to a method for simultaneously cutting a plurality of heat absorbent element sheets for regenerative type heat exchange apparatus in which the variously formed element sheets originate from independent sources.

It is the usual practice in assembling element baskets for use in heat exchangers of the type disclosed to cut the variously formed element sheets individually, and intermix them by hand in baskets that assume the size and configuration desired. Such assembly methods are slow and costly, and they require a supply of semiskilled labor that is not always readily available. For these reasons it is the principal object of this invention to provide an arrangement that automatically takes sheet material from a plurality of sources, forms it differently and then simultaneously cuts a plurality of sheets to a predetermined size for insertion into a heat exchanger basket.

The various features of novelty which characterize the invention are defined in the specification and claims. For a more complete understanding of the invention reference should be had to the specification in conjunction with the drawings in which there is illustrated a preferred embodiment of the invention.

Figure 1:
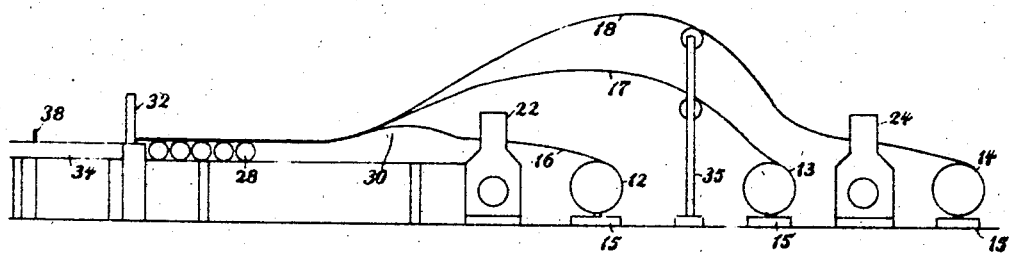
Figure 2:
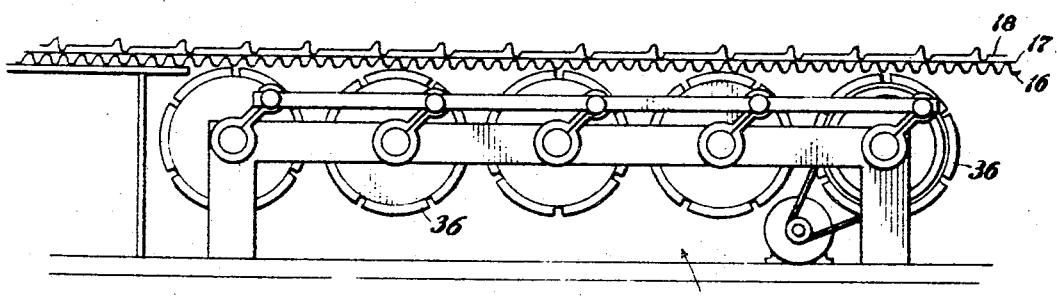

In the drawings:
FIGURE 1 is a diagrammatic side elevation of an arrangement embodying my invention, and
FIGURE 2 is an enlarged view showing details of the magnetic feed rolls.

Referring to the drawing, a series of material rolls 12, 13 and 14 are rotatably held on supports 15 whereby they may be readily unrolled by a light pull upon their ends 16, 17 or 18 and then supplied to forming presses or rolls 22 and 24, or directly to the feeder rolls 28 in the manner shown by roll 13.

The forming presses 22 and 24 are actuated independently by means not illustrated to impart to the material carried by rolls 12 and 14 a corrugated, notched or otherwise formed surface that provides an increase in surface area therefor. As the formed material leaves the forming presses 22 and 24 it is supplied serially to a single or a group of feeder rolls 28 to which has been imparted a strong magnetic field.

The magnetic feeder rolls 28 are driven similarly in a single direction to provide a predetermined surface speed at which it is desired the several layers of material thereon be supplied to the cutting shears 32 and to the gage table 34.

As the shears 32 are actuated to a closed position they momentarily block the advancement of material on the roller bed 28 whereby there is a brief hesitation or slippage in the supply of the material on the rolls 28. At the same time the magnetic force impressed upon the rolls 28 must necessarily be sufficiently strong to enable a plurality of sheets to be drawn from different sources and presented simultaneously with substantially no shifting therebetween to the cutting shears 32 when the rolls 28 are rotated in unison.

The source of the magnetic field upon the feeder rolls 28 preferably comes from a series of permanent magnetic shoes 36 carried by the rolls 28. However, it is considered within the purview of this invention to utilize an electromagnetic force impressed upon the feed rolls 28 to maintain the several sheets of material thereon in a preferred position relative to one another.

The forming rolls 22 and 24 are preferably rotated to provide a lineal speed at their circumferential periphery somewhat less than that provided by the feed rolls 28. This arrangement is desirable to prevent formed strip material from rolls 22 and 24 from backing up in advance of the shears 32 and being forced away from the feed rolls 28. When the strip of material is forced away from the rolls 28 the magnetic attraction therebetween is broken and there remains no positive linkage between the feeder rolls 28 and the material strip to draw said material strip from the rolls 22 and 24 and advance it on to the shears 32.

In order that the material strip supplied by the rolls 12, 13 and 14 will have a similar approach to feeder rolls 28, a "hump" table 30 is provided to receive the material from each of the material sources and present it to the rolls 28 and shears 32 in sandwich form.

A support member 35 having a number of roller supports is adapted to present the strip material in superposed form to the "hump" table 30. The roller supports are preferably adapted to be adjusted vertically to provide proper separation of the strip material and proper presentation of said material to the "hump" table 30.

The shears 32 is operated in response to movement of the indexing means or trigger 38 on gage table 34 when properly actuated by a length of material advanced by rolls 28. The trigger 38 may be adjustably moved longitudinally along the gage table 34 to provide sheets of various lengths to fill the requirements of the assembly; however such means for so adjusting the trigger is well known in the art and does not itself constitute a part of the invention. The trigger 38 may be connected by either electrical or mechanical means (not illustrated) to shears 32 in order that the shears may be actuated at the proper time to effect a sheet of predetermined size.

The feed rolls 28 are rotated uniformly in the same direction to provide substantially the same lineal speed at their circumferential surfaces whereby their combined upper surfaces comprise a composite magnetic bed which moves slowly in the direction of shears 32. The feed rolls 28 may all be of the same size or they may, for example, be of graduated size to impart to the sheet material a predetermined curvature that facilitates uniform movement thereof.

Movement of the trigger means 38 may not only be linked to the actuation of the shears 32 but to the roller feed means 28 and to the forming rolls 22 and 24 so that the entire feeder means supplies material to the shears 32 at a predetermined rate. However, with the linkage between the rolls 28 and 30 and the several layers of element material thereon being one of magnetic attraction only, a certain shifting and repositioning the element sheet is permitted and a synchronized linkage is not deemed essential to the operation of the device.

Thus, while the invention has been described with reference to the embodiment shown in the drawing, it is apparent that various changes may be made without departing from the spirit of the invention. It is therefore intended that all matter contained in the above description or shown in the accompanying drawings shall be interpreted as illustrative and not in a limiting sense.

We claim:

1. The method of simultaneously drawing magnetic sheet material having various surface configurations from a plurality of independent sources and advancing it in superposed layers to a single point of use comprising, supplying said material in superposed layers from independently supported rolls to roller feed means having a field of magnetic attraction providing a magnetic field to hold said sheets substantially fixed thereto, and rotating said roller feed means to draw said sheet material from said plurality of independent sources and advance it as superposed layers to a single point of use.

References Cited
UNITED STATES PATENTS

| | | | |
|---|---|---|---|
| 493,860 | 3/1893 | Fay | 72—185 |
| 1,119,180 | 12/1914 | Krauth | 83—596 X |
| 1,646,989 | 10/1927 | Blecker | 198—41 X |
| 2,247,766 | 7/1941 | Boerger | 83—212 X |
| 2,527,911 | 10/1950 | Buccicone | 271—74 X |
| 2,837,331 | 6/1958 | Feick | 226—93 |
| 3,123,905 | 3/1964 | Thomas | 72—196 |

JAMES M. MEISTER, *Primary Examiner.*